(12) United States Patent
Nelson

(10) Patent No.: US 11,746,813 B2
(45) Date of Patent: Sep. 5, 2023

(54) LOAD CONVEYANCE SYSTEM FOR MODULAR FLOATING PLATFORMS

(71) Applicant: Bruce Nelson, Minneapolis, MN (US)

(72) Inventor: Bruce Nelson, Minneapolis, MN (US)

( * ) Notice: Subject to any disclaimer, the term of this patent is extended or adjusted under 35 U.S.C. 154(b) by 0 days.

(21) Appl. No.: 17/451,423

(22) Filed: Oct. 19, 2021

(65) Prior Publication Data

US 2022/0227466 A1 Jul. 21, 2022

Related U.S. Application Data

(60) Provisional application No. 63/093,578, filed on Oct. 19, 2020, provisional application No. 63/093,592, filed on Oct. 19, 2020, provisional application No. 63/093,565, filed on Oct. 19, 2020, provisional application No. 63/093,581, filed on Oct. 19, 2020.

(51) Int. Cl.
*F16B 7/02* (2006.01)
*E02B 3/06* (2006.01)
*B63B 35/44* (2006.01)
*B63B 7/04* (2020.01)
*B63B 27/14* (2006.01)
*B63B 75/00* (2020.01)
*B63C 3/00* (2006.01)
*B63C 1/02* (2006.01)

(52) U.S. Cl.
CPC .................. *F16B 7/02* (2013.01); *B63B 7/04* (2013.01); *B63B 27/143* (2013.01); *B63B 35/44* (2013.01); *B63B 75/00* (2020.01); *B63C 1/02* (2013.01); *B63C 3/00* (2013.01); *E02B 3/064* (2013.01)

(58) Field of Classification Search
CPC ... F16B 7/00; F16B 7/02; B63B 75/00; B63B 7/00; B63B 7/04; B63B 27/00; B63B 27/143; B63B 35/00; B63B 35/44; B63C 1/00; B63C 1/02; B63C 1/08; B63C 3/00; E02B 3/064
USPC ................................ 114/263, 264, 266, 267
See application file for complete search history.

(56) References Cited

U.S. PATENT DOCUMENTS 7,117,809 B2 * 10/2006 Lamoureux ............... B63C 1/02
114/263

FOREIGN PATENT DOCUMENTS

CN 208199859 U * 12/2018 ............... B65H 5/22

* cited by examiner

*Primary Examiner* — Lars A Olson
(74) *Attorney, Agent, or Firm* — Todd R. Fronek; Larkin Hoffman Daly & Lindgren, Ltd.

(57) ABSTRACT

A roller ball assembly that provides a safe, efficient, unobtrusive and easy to install load conveyance system to facilitate the travel of a watercraft on or off of a floating vessel platform with no or minimal potential of causing damage to the watercraft's hull or to the float modules. The roller ball assembly is comprised of a sphere rotatable with respect to a floating vessel platform. A number of roller ball assemblies can be mounted into a floating vessel platform in the junction areas of float modules.

17 Claims, 7 Drawing Sheets

LOAD CONVEYANCE SYSTEM FOR MODULAR FLOATING PLATFORMS

FIELD OF INVENTION

This description relates to a load conveyance system that can be incorporated into modular floating platforms. More particularly, the description details landing and launching various types of watercraft on floating vessel platforms while reducing the damage potential to the floating vessel platform and the watercraft's hull.

BACKGROUND

Modular floating platforms have been in use for a number of years and are increasing both in popularity and applications. Modular floating platforms are typically constructed with molded plastic float modules that can be interconnected to form a variety of sizes and shaped floating platforms. Many modular floating platforms have been adapted for use as a floating vessel platform that provides a means of storing watercraft out of the water where a watercraft can be driven on top of the floating platform for dry storage. In such applications it is desirable to provide a means for watercraft with different hull sizes and shapes to be easily and safely propelled onto the floating vessel platform without damaging the hull of the watercraft or causing wear and tear on the floating vessel platform float modules.

Some floating vessel platforms are constructed with float modules that have different heights, sometimes referred to as tall and short float modules. By utilizing short float modules in the center section of the floating vessel platform it was found that a recessed channel could be formed that can act as a keel guidance system to keep the hull of a watercraft centered on the floating vessel platform. In such floating vessel platforms the short float modules are recessed but have a generally flat surface and as the watercraft is propelled onto the floating platform the hull of the watercraft will typically engage with the flat surface of the short float modules and/or with the top edges of the adjoining tall float modules, thereby causing wear and tear on the float modules.

Another problem found with floating vessel platforms is that whereas a recessed center channel provides a means to guide a watercraft onto the floating platform, it also can create friction between the hull of the watercraft and the recessed float modules and the adjoining taller float modules, making it difficult to propel the watercraft on to and off of the floating vessel platform.

To remedy wear and tear issues, some modular floating vessel platforms are fitted with tubular members that can be secured adjacent to sides of tall float modules and on top of recessed short float modules that are positioned in between the tall float modules. These tubular members are intended to support the weight of the watercraft and are generally long enough to support the watercraft hull that comes into contact with the floating vessel platform. The tubular members have a diameter that is large enough to elevate the watercraft hull off of the surfaces of the floating vessel platform. Such tubular members, or "bunks" help to reduce wear and tear on the float modules but do not always reduce the friction sufficiently to allow watercraft to easily move on and off of the floating vessel platform.

Another way that has been used to facilitate the movement of watercraft on and off of floating vessel platforms, is to incorporate a winch system and pulleys into the floating vessel platform that is used to mechanically pull the watercraft onto the floating vessel platform and to pull it off using a back winch system that includes a combination of the winch and pulleys mounted rearward on one or more sides of the floating vessel platform.

The need to add bunks and a winch/back winch system to a floating vessel platform to reduce wear and tear and to facilitate the movement of the watercraft adds to the complexity and cost of installing a floating vessel platform and reduces the convenience of using a floating vessel platform as a simple drive on drive off watercraft storage platform.

There are floating vessel platforms that are comprised of single float modules that are large enough to receive the watercraft rather than a plurality of interconnected float modules. Such single "slab" style floating vessel platforms lack flexibility inherent with floating vessel platforms with a plurality of interconnected smaller float modules, which limits the ability of a watercraft to propel itself on to and off of a slab style floating vessel platform. Consequently, many slab style floating vessel platforms are equipped with various styles of wheels and rollers to facilitate travel of a watercraft on such floating vessel platforms. To be effective, a number of wheels and rollers, or a combination thereof, are arranged in-line and spaced apart longitudinally along the length of the floating vessel platform where the hull of the watercraft may come into contact with the surface of the floating vessel platform. In some instances, the wheels and rollers are partially concealed in pockets formed into the floating vessel platform but are nevertheless are prominently displayed which can detract from the aesthetic appearance of the floating vessel platform.

In the case of both wheel and roller devices that are used in floating vessel platforms there are edges on each side of the wheel or roller. If the hull of a watercraft comes into contact with the edges of the wheels or rollers, the hull can be damaged or marred.

SUMMARY

A roller ball device attachable to a floating vessel platform is described. The roller ball device is a rotatable sphere that is mounted in a bracket or housing and adaptable to be installed into a floating vessel platform. A plurality of roller ball devices can be placed in a floating vessel platform assembly to facilitate the travel of a watercraft on or off of a floating vessel platform with no or minimal potential of causing damage to the watercraft's hull by virtue of the absence of edges on the spherical shaped roller.

BRIEF DESCRIPTION OF THE DRAWINGS

Some embodiments of the concept are illustrated as an example and are not limited by the figures of the accompanying drawings, in which like references may indicate similar elements and which:

FIG. 5b is a close-up view of a connecting tab that is molded into each corner of the float modules used in the floating vessel platform depicted in FIG. 5a.

DETAILED DESCRIPTION

The terminology used herein is for purposes of describing particular embodiments only and is not intended to be limiting of the scope of the description. The present disclosure is considered as an exemplification of the concept and is not intended to limit the concept to the specific embodiments illustrated by the figures or description below.

Figure 3:
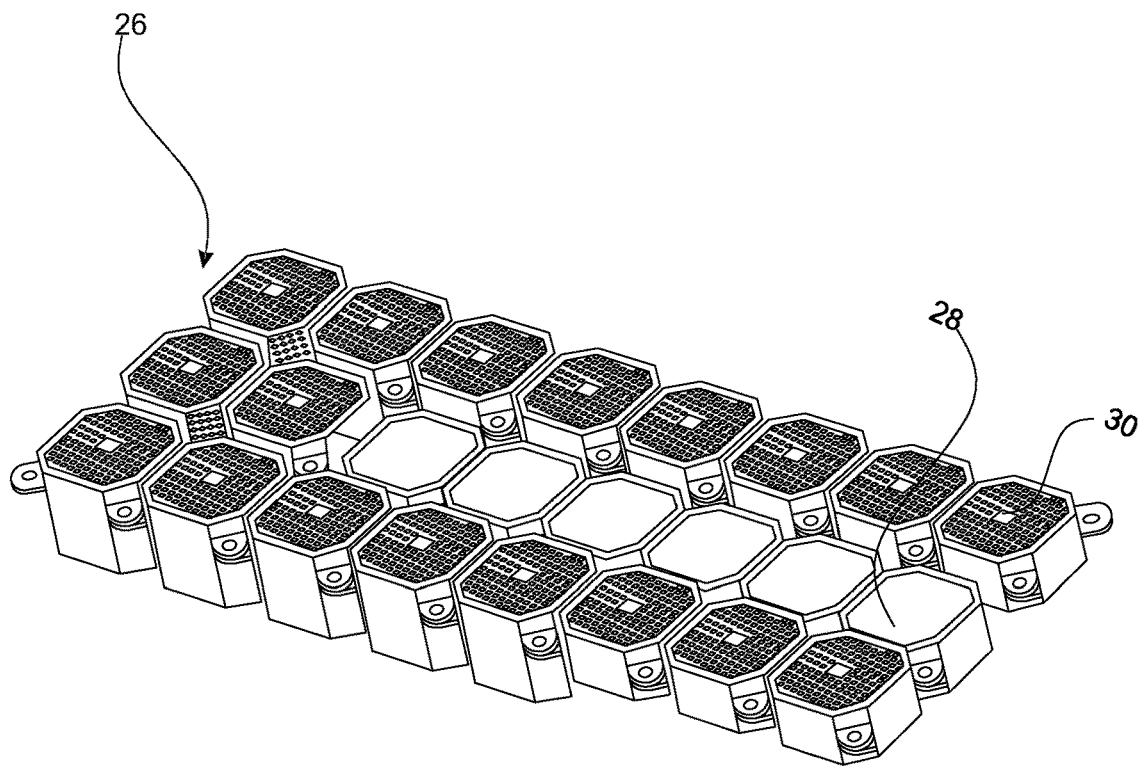
FIG. 3 is a perspective view of one type of floating vessel platform with a recessed center channel comprised of short float modules and adjoining tall float modules.
Figure 4:
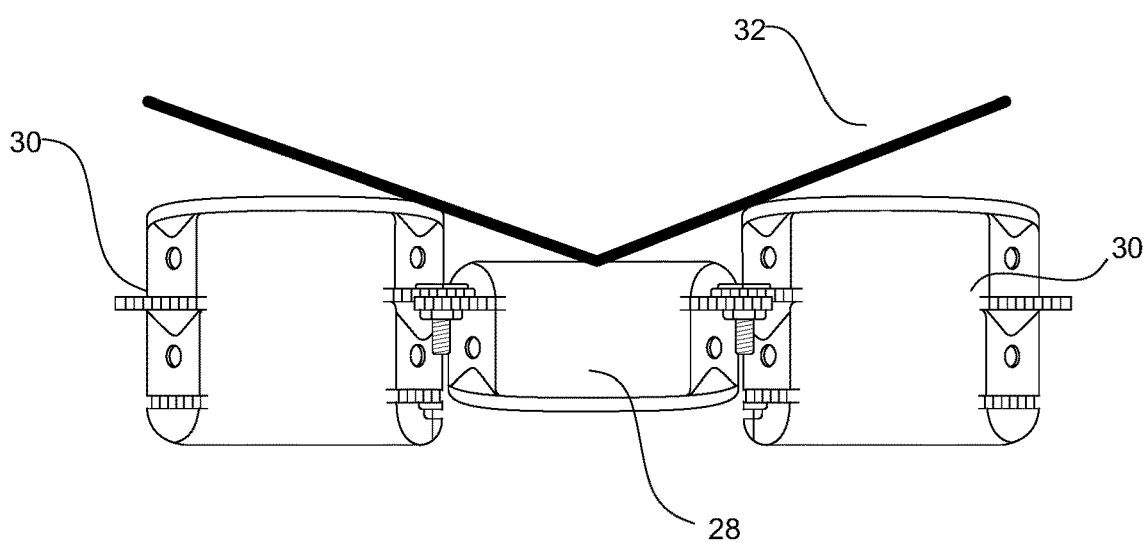
FIG. 4 is a cross-section view of one type of floating vessel platform with a recessed center channel comprised of a short float module and adjoining tall float modules with a profile of a hull of a watercraft resting thereon.

Current modular floating vessel platforms have been generally designed with a recessed center channel that provides a keel guidance mechanism to keep a watercraft centered on the floating vessel platform as it travels on and off the platform. For example, as illustrated in FIG. 3 a floating vessel platform assembly 26 is designed with short float modules 28 which are centrally located in the floating vessel platform assembly 26 and are attached to adjoining tall float modules 30. The short float modules 28 are on a plane lower than the top surface of the tall float module 30. A profile of a boat hull 32 is shown in FIG. 4 positioned on a cross section view the floating vessel platform assembly 26. In this instance, the boat hull 32 is supported on the upper edges of the tall float modules 30 and the keel of the boat is in contact with the top surface of the short float modules 28.

As the watercraft travels on and off the floating vessel platform 26, the hull 32 of the watercraft repeatedly engages with the upper edges of the tall flat modules 30 and the top surface of the short float modules 28. Over time, contact between the hull and these surfaces can cause wear and tear on the float modules, eventually causing a breach in one or more of the float modules. A breach in one or more of the float modules can allow water to enter the float modules, causing them to lose buoyancy to the point where the floating vessel platform will no longer be able to support the weight of the watercraft and maintain the hull above the waterline, which is the essential purpose of the floating vessel platform. Additionally, in some instances, the amount of friction between the float modules and the boat hull may make it difficult for the watercraft to efficiently travel on and off of the floating vessel platform.

Figure 1:
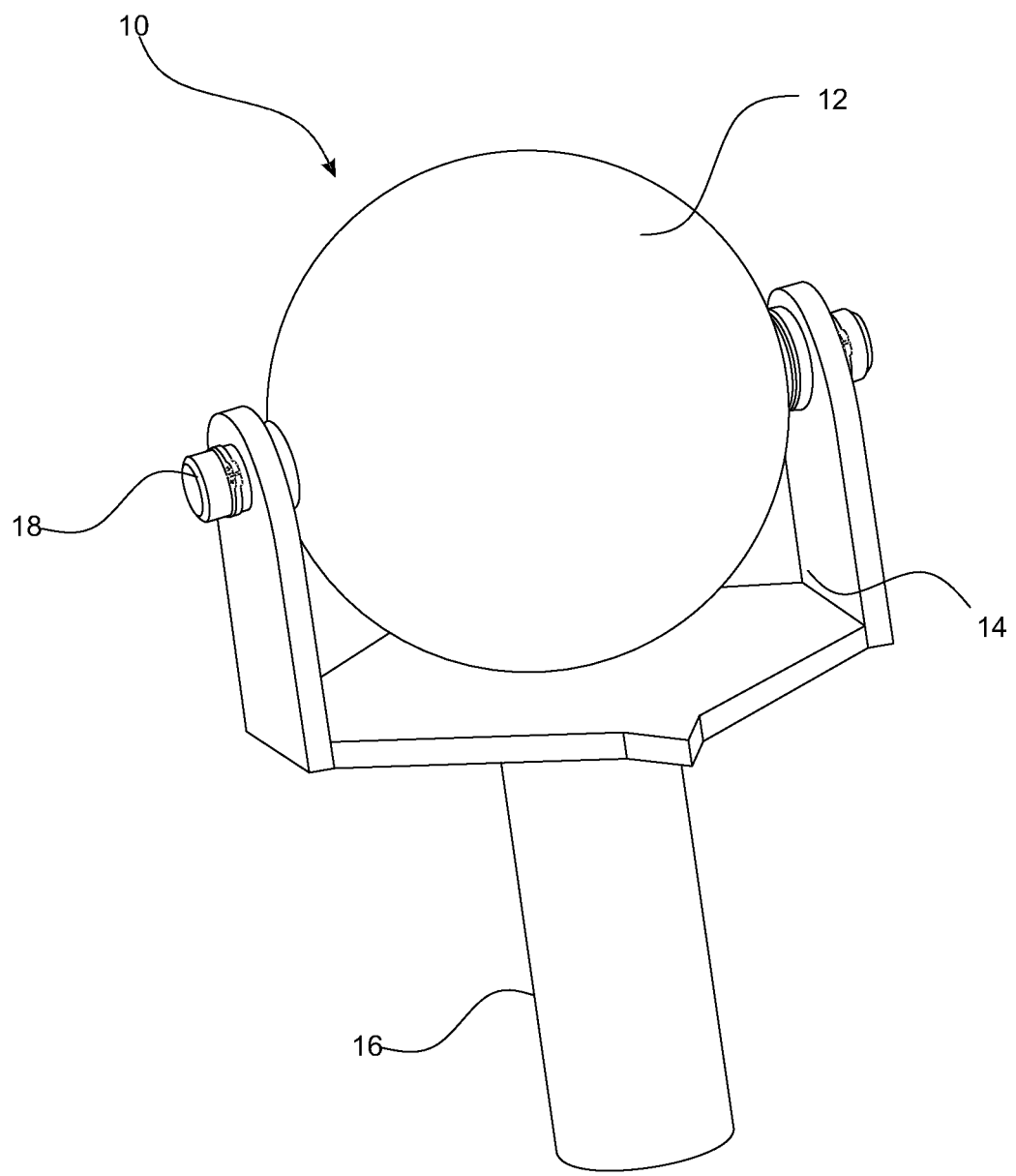
FIG. 1 is a perspective view of one example of a roller ball assembly attachable to a floating vessel platform.
Figure 2:
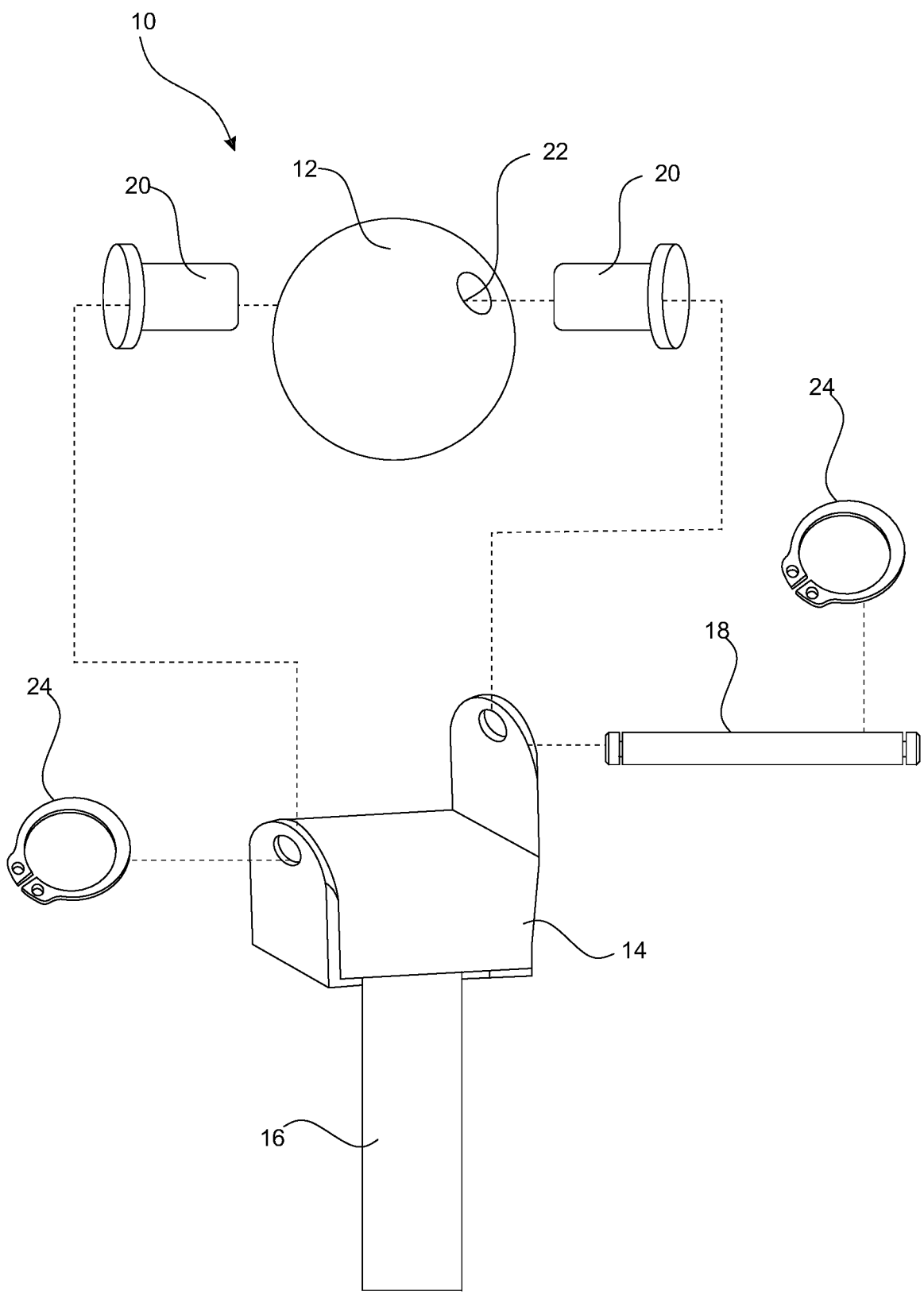
FIG. 2 is an exploded view of the roller ball assembly depicted in FIG. 1.

FIGS. 1 and 2 illustrate a roller ball assembly 10 used to minimize wear and tear on a floating vessel platform. Assembly 10 includes a sphere or spherical surface 12, a bracket 14 with a mounting post 16 attached thereto, and a shaft 18 coupled with the spherical surface 12. In one embodiment, a series of two or more roller ball assemblies 10 are designed to be mounted into a floating vessel platform to provide a unobtrusive load transfer conveyance system that provides means for a watercraft to smoothly and efficiently travel on and off a floating vessel platform and eliminate the friction and wear and tear on the floating vessel platform float modules and the boat hull.

With reference to FIG. 2, assembly 10 includes one or more bearings sleeves 20 inserted into a through hole 22 located in the center of the spherical surface 12. The spherical surface 12 is then placed into the bracket 14. The shaft 18 is inserted through the bracket 14 and the spherical surface 12 and a retaining device 24 is attached to the ends of the shaft 18 secure the shaft 18 to the bracket 14. As discussed herein, one or more assemblies 10 can be positioned in a floating vessel platform.

Figure 5A:
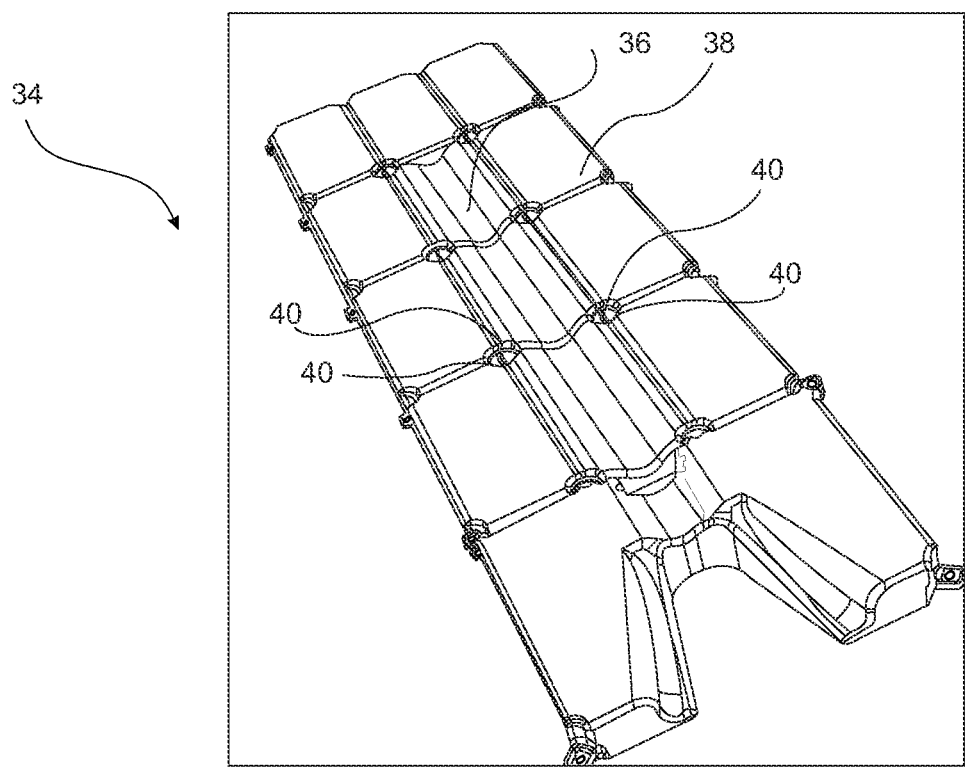
FIG. 5a is a perspective view of a floating vessel platform comprised of center channel float modules that have a contoured "U" shaped upper surface and adjoining flat surfaced float modules.
Figure 5B:
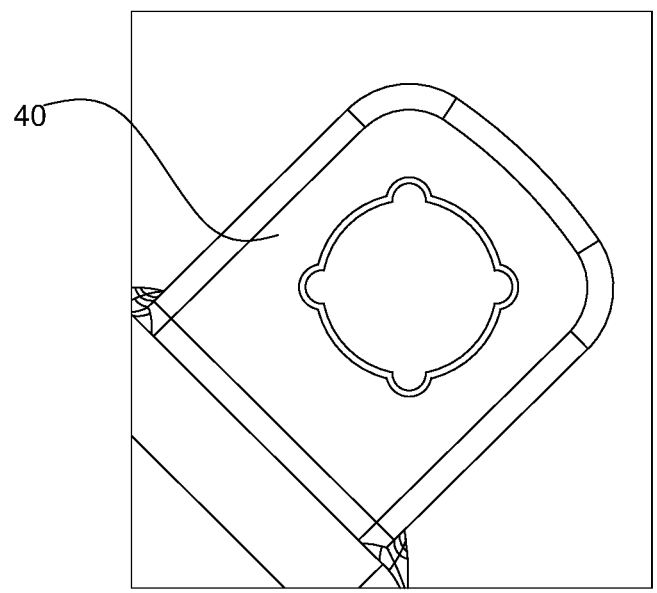
Figure 6A:
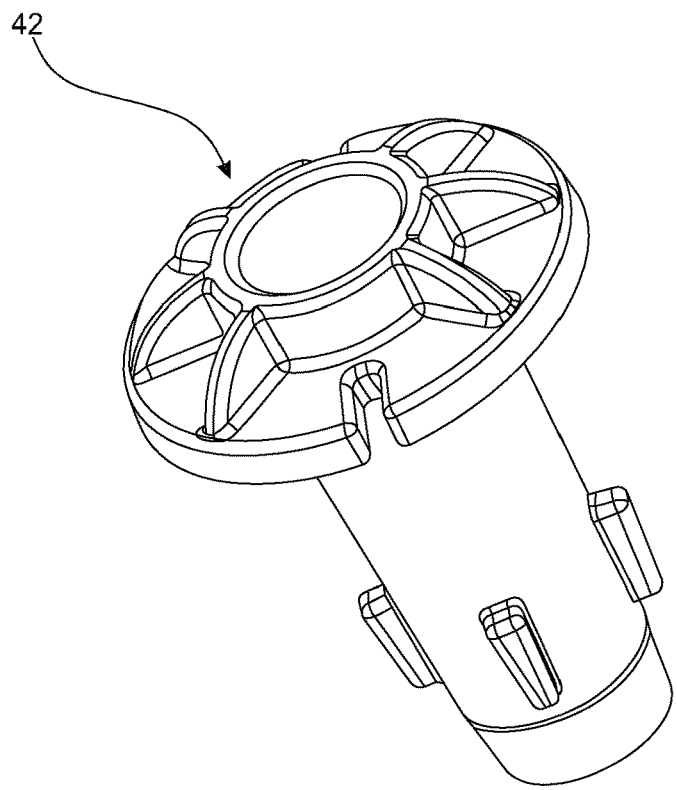
FIG. 6a is a perspective view of one type of connector used in floating vessel platforms.
Figure 6B:
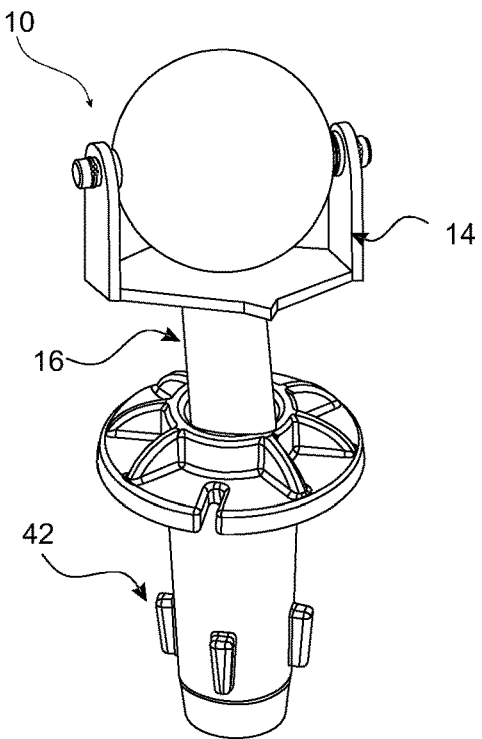
FIG. 6b is a perspective view of a roller ball assembly secured in a floating vessel platform connector.

FIG. 5a depicts a floating vessel platform assembly 34 comprised of contoured center float modules 36 and adjoining flat surfaced float modules 38. In this floating vessel platform assembly, the sides of the contoured center floats 36 are the same height as the adjoining flat surfaced float modules 38. The float modules have connecting tabs 40 located on the corners of the float modules 36 and 38, which can be secured together using a connector 42 with an internal hollow chamber, such as one illustrated in FIG. 6a. As shown in FIG. 6b the roller ball assembly 10 can be readily mounted into the connector 42 by inserting the mounting post 16 into the connector 42.

Figure 7:
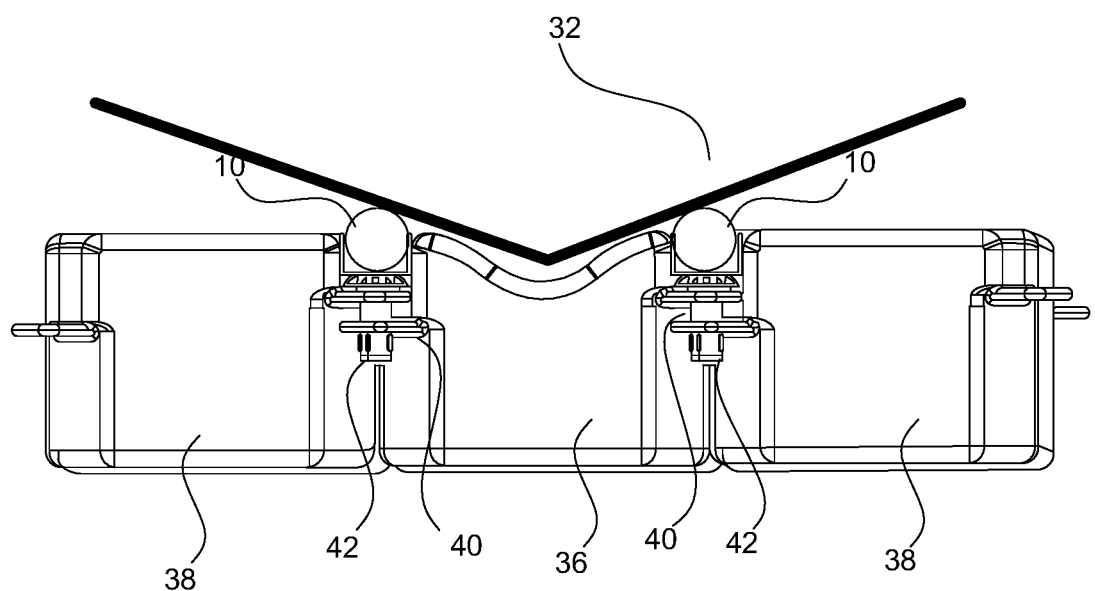
FIG. 7 is a cross-section view the floating vessel platform depicted in FIG. 5a illustrating attachment of roller ball assemblies in connectors of the floating vessel platform with a profile of a watercraft hull resting on the floating vessel platform.
Figure 8:
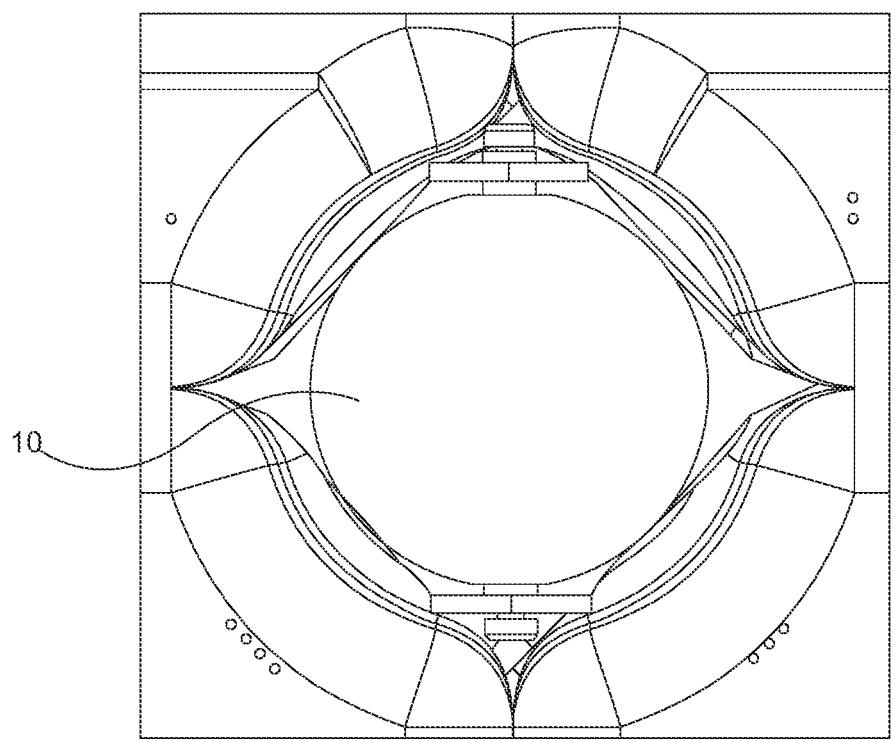
FIG. 8 is a top close-up view of a roller ball assembly that is installed at a junction point of four float modules.

FIG. 7 is a cross section view of the floating vessel platform in FIG. 5a showing the connecting tabs 40 secured together with connectors 42. Roller ball assemblies 10 are mounted into connectors 42 using the mounting post 16 attached to the bottom of the bracket 14 shown in FIG. 1. In one embodiment, when the roller ball assembly is installed into the floating vessel platform, the roller ball bracket 14 is completely below the top surfaces of the float modules 36 and 38 with only the top section of the spherical surface 12 exposed above the top surfaces of the float modules 36 and 38. To further illustrate, FIG. 8 is a top view of the roller ball assembly mounted into the intersection of four assembled float modules. Pairs of roller ball assemblies 10 can be mounted longitudinally in floating vessel platforms in whatever number is necessary for various lengths and styles of watercraft. As a watercraft is propelled onto the floating vessel platform the watercraft's hull 34 rides on top of the roller ball assemblies 10 and does not come into direct contact with the float modules.

Figure 9:
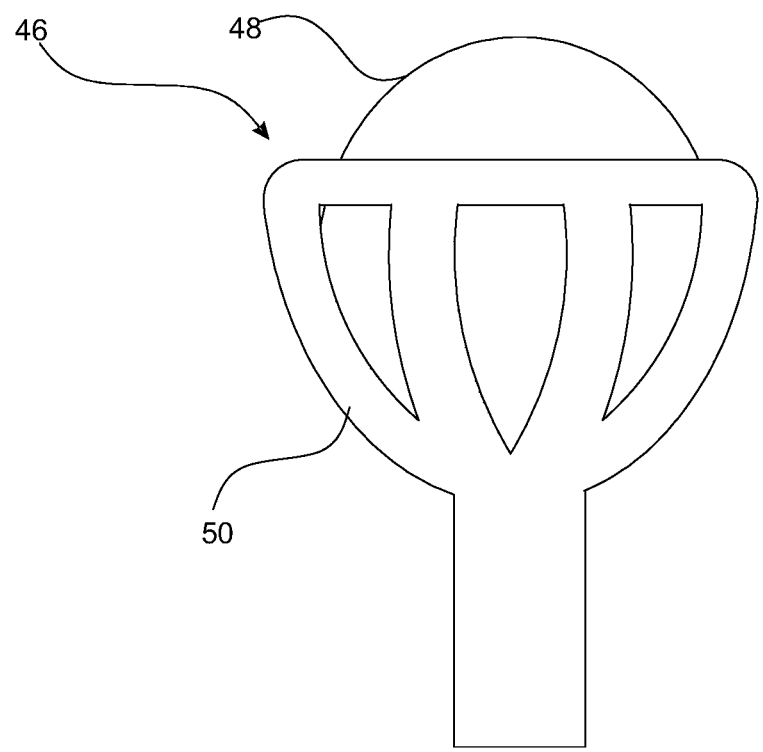
FIG. 9 is a profile view of an alternate embodiment of the roller ball assembly.

FIG. 9 illustrates an alternate embodiment of the concepts presented herein where the roller ball assembly 46 is comprised of a spherical surface 48 housed in a bracket 50 that allows the spherical surface to rotate in any direction within the housing thereby eliminating the need to rotate the spherical surface on a shaft. In one embodiment, the bracket 50 includes a top retaining element that includes a minimum dimension that is less than a diameter of the spherical surface. Additionally, a top portion of the spherical surface is exposed relative to the top retaining element to engage a watercraft. In this embodiment, the spherical surface 48 can freely rotate while the top retaining element maintains the spherical surface 48 within the bracket 50. To insert spherical surface 48 within the bracket 50, in one embodiment, the spherical surface 48 can deflect with respect to the top retaining element of vice versa.

Figure 10:
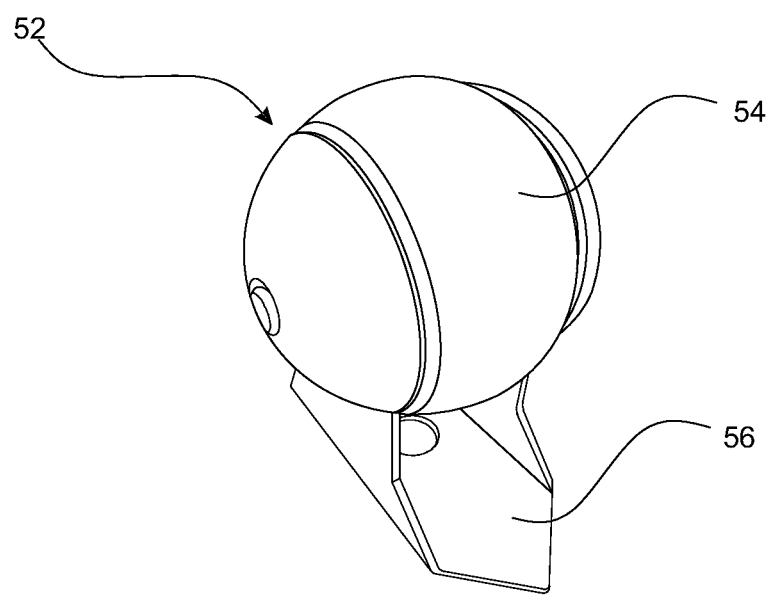
FIG. 10 is a perspective view of another alternate embodiment of the roller ball assembly.

FIG. 10 illustrates another alternate embodiment of my concept where the spherical surface 54 that is used in the roller ball assembly is segmented thereby allowing the bracket 56 to be contained within the segments of the spherical surface.

A floating vessel platform equipped with roller ball assemblies as described herein provides a safe, efficient, unobtrusive and easy to install load conveyance system to facilitate the travel of a watercraft on or off of a floating vessel platform with no or minimal potential of causing damage to the watercraft's hull or to the float modules. Floating vessel platforms of various sizes and shapes can be equipped with as many roller ball assemblies as is necessary to accommodate watercraft of various types and lengths. The roller ball assemblies eliminate the need to secure bunks and, in many cases, eliminates the need to use winch systems on floating vessel platforms. Thus, it can be seen that users of my load conveyance system will find it to be a valued addition to floating vessel platforms that will make the drive on docking experience easier and extend the useful life of the floating vessel platform while virtually eliminating the potential of damage the hull of their watercraft.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents.

What is claimed is:

1. In a floating vessel platform having a plurality of modular float modules, a load conveyance system, comprising:
   a spherical surface rotatable with respect to the modular float modules;
   a shaft rotatably supporting the spherical surface;
   a bracket rotatably supporting the shaft; and
   a post coupled with the bracket and positioned between adjacent modular float modules.

2. The load conveyance system of claim 1, further comprising a connector configured to receive the post.

3. The load conveyance system of claim 2, wherein the connector includes a chamber, wherein the post is positioned within the chamber.

4. The load conveyance system of claim 1, further comprising first and second bearing sleeves connected with the bracket and to opposed sides of the spherical surface.

5. The load conveyance system of claim 1, wherein the bracket includes a retaining element defining a minimum dimension that is less than a diameter of the spherical surface, the spherical surface positioned such that a portion of the spherical surface is exposed above the retaining element.

6. A floating vessel platform, comprising:
   a plurality of float modules; and
   a plurality of roller ball assemblies positioned between the plurality of float modules, wherein each of the plurality of roller ball assemblies includes a bracket rotatably supporting a shaft and a post extending from the bracket, the shaft rotatably supporting a spherical surface.

7. The floating vessel platform of claim 6, wherein each of the roller ball assemblies include a portion positioned above a top surface of the plurality of float modules.

8. The floating vessel platform of claim 7, wherein each of the plurality of float modules include a tab configured to receive a corresponding connector positioned to receive one of the plurality of roller ball assemblies.

9. The floating vessel platform of claim 8, wherein each connector includes a chamber having a corresponding post positioned within the chamber.

10. A method of forming a floating vessel platform, comprising:
    positioning a plurality of float modules adjacent to one another and defining a top platform surface; and
    positioning a plurality of roller assemblies in between the plurality of float modules, each of the plurality of roller assemblies including a spherical surface extending above the top platform surface, wherein each of the plurality of roller assemblies includes a bracket rotatably supporting a shaft and a post extending from the bracket, the shaft rotatably supporting the spherical surface.

11. The method of claim 10, wherein each of the plurality of float modules include a tab configured to receive a corresponding connector positioned to receive one of the plurality of roller assemblies.

12. The method of claim 11, wherein each connector includes a chamber having a corresponding post positioned within the chamber.

13. In a floating vessel platform having a plurality of modular float modules, a load conveyance system, comprising:
    a spherical surface rotatable with respect to the modular float modules; and
    a bracket coupled with the spherical surface and positioned between adjacent modular float modules, wherein the bracket includes a retaining element defining a minimum dimension that is less than a diameter of the spherical surface, the spherical surface positioned such that a portion of the spherical surface is exposed above the retaining element.

14. The load conveyance system of claim 13, wherein the retaining element includes a shaft and a retaining device securing the shaft to the bracket.

15. The load conveyance system of claim 13, wherein the spherical surface is housed in the bracket, wherein the bracket allows rotation of the spherical surface in any direction.

16. The load conveyance system of claim 13, further comprising a connector configured to receive a post.

17. The load conveyance system of claim 16, wherein the connector includes a chamber, wherein the post is positioned within the chamber.

* * * * *